US008249674B2

(12) United States Patent
Lin

(10) Patent No.: US 8,249,674 B2
(45) Date of Patent: Aug. 21, 2012

(54) PORTABLE ELECTRONIC DEVICE

(75) Inventor: Jui-Hsiang Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 476 days.

(21) Appl. No.: 12/634,804

(22) Filed: Dec. 10, 2009

(65) Prior Publication Data

US 2011/0029107 A1 Feb. 3, 2011

(30) Foreign Application Priority Data

Jul. 28, 2009 (CN) .......................... 2009 1 0304905

(51) Int. Cl.
*H04W 88/02* (2009.01)
(52) U.S. Cl. ........................ 455/575.4; 700/94; 335/279
(58) Field of Classification Search ............... 455/575.4, 455/566; 700/94; 600/538; 335/279
See application file for complete search history.

(56) References Cited

U.S. PATENT DOCUMENTS 7,961,870 B2 *   6/2011  Lucey et al. .................. 379/447
2008/0032701 A1 * 2/2008  Johann ....................... 455/456.1

* cited by examiner

*Primary Examiner* — Phuoc Doan
(74) *Attorney, Agent, or Firm* — Altis Law Group, Inc.

(57) ABSTRACT

An exemplary portable electronic device includes a main body, a cover member movably connected with the main body, a sensing unit, a signal processing unit, an audio output unit. The audio output unit is configured for outputting audio signals and disposed in either one of the main body and the cover member. The audio output unit includes a magnetic member. The sensing unit is disposed in the other one of the main body and the cover member and configured for detecting relative displacement of the magnetic member and capable of generating a corresponding command signal. The signal processing unit is disposed in the main body and electrically connected to the sensing unit. The signal processing unit is capable of actuating different operation modes according to the command signal.

10 Claims, 3 Drawing Sheets

PORTABLE ELECTRONIC DEVICE

BACKGROUND

1. Technical Field

The disclosure generally relates to portable electronic devices, more particularly, to a portable electronic device using magnetic induction to actuate the operation system of the portable electronic device.

2. Description of the Related Art

Nowadays, slide structures are widely used in mobile phones, personal digital assistants (PDAs) and other portable electronic devices. A slide-type portable electronic device generally has a main body and a sliding cover. When the sliding cover slides along the main body to different locations, the portable electronic device can be respectively switched to corresponding operation modes.

Generally, most portable electronic devices change to different operation modes previously associated with the movements of the cover by magnetic induction. A magnetic sensing device and a magnetic device are respectively disposed in the main body and the cover. When the cover moves along the main body, the magnetic sensing device and the magnetic device have a relative displacement, then the magnetic sensing device can generate a command signal, so that the portable electronic devices can invoke different operation modes. However, despite the additional magnetic device being small they still increase the size and weight of the portable electronic device, which does not match the development trend of miniaturization and increase costs.

Therefore, there is room for improvement within the art.

BRIEF DESCRIPTION OF THE DRAWINGS

Many aspects of a portable electronic device can be better understood with reference to the following drawings. The components in the drawings are not necessarily drawn to scale, the emphasis instead being placed upon clearly illustrating the principles of the exemplary portable electronic device. Moreover, in the drawings, like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
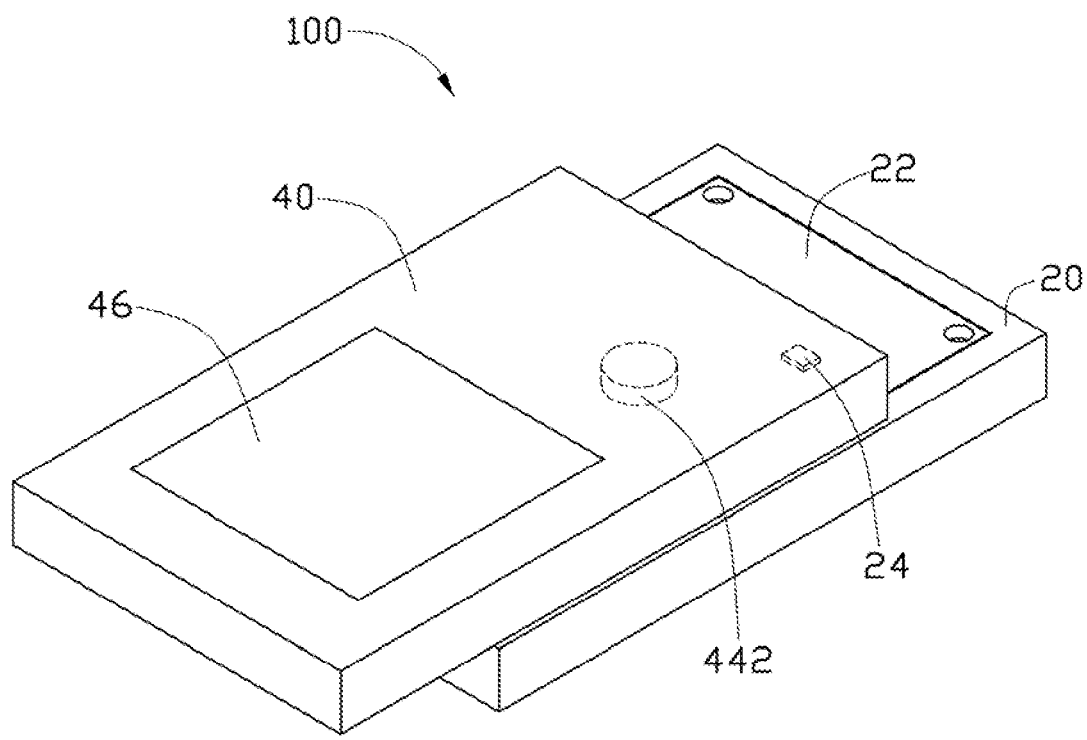
FIG. 1 is a schematic view of a portable electronic device in an open state, according to an exemplary embodiment.
Figure 2:
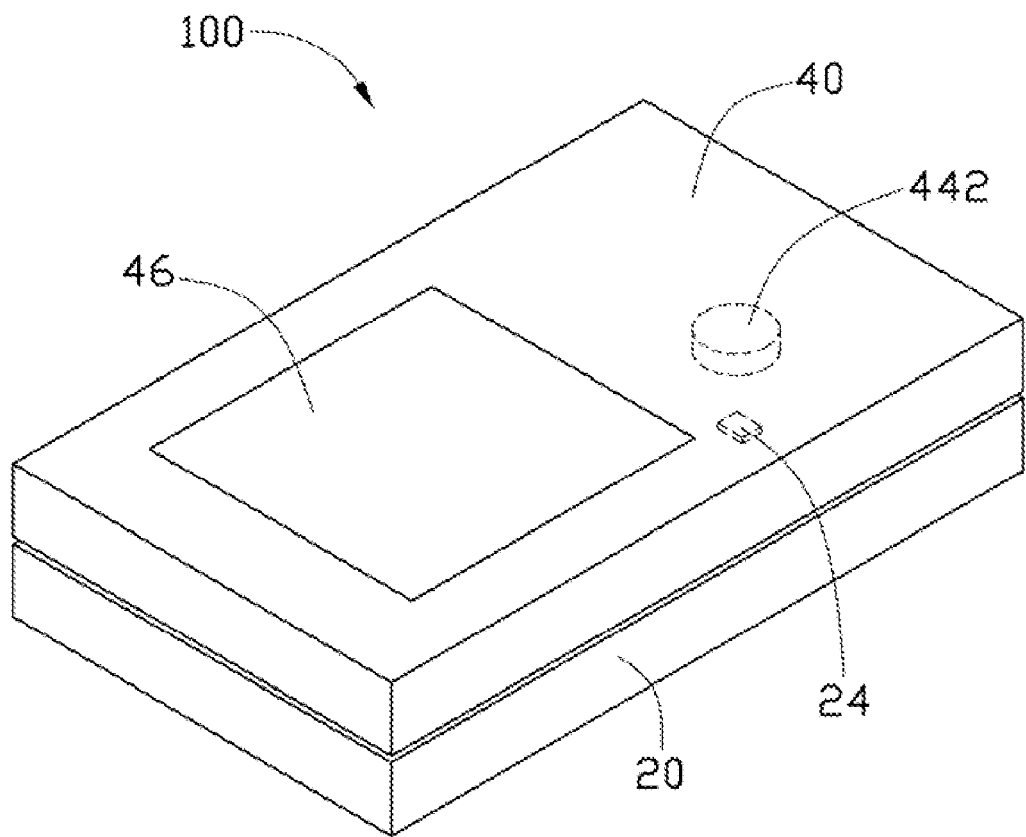
FIG. 2 is a schematic view of the portable electronic device in a closed state.

FIGS. 1-2 show an exemplary embodiment of a portable electronic device 100, which can actuate the operation system though magnetic induction. The portable electronic device 100 may be a PDA, a mobile phone, etc., which has sliding structure or flipping structure. The mobile phone with sliding structure is taken here as an exemplary application.

Figure 3:
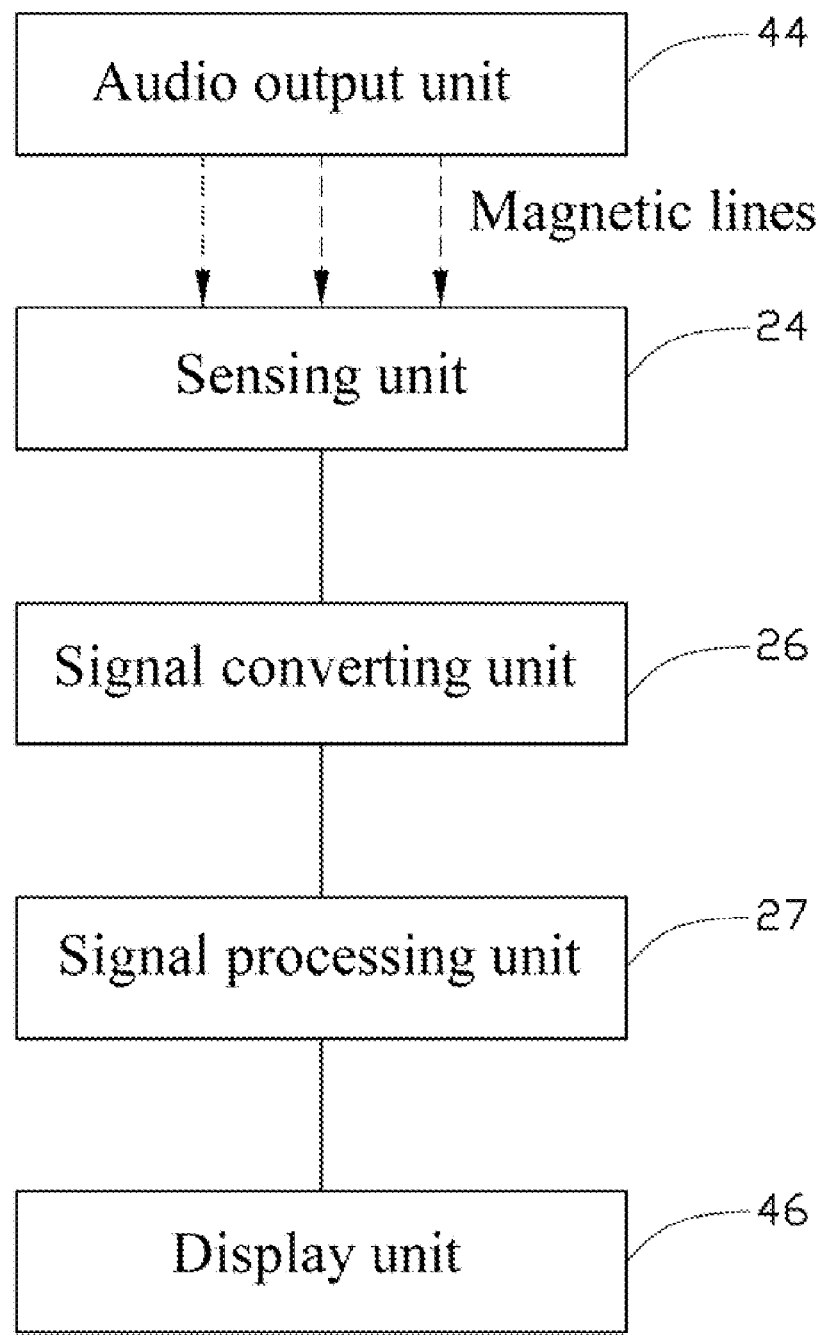
FIG. 3 is a functional block view of the portable electronic device shown in FIG. 1.

The portable electronic device 100 includes a main body 20 and a cover member 40. The cover member 40 can be slidably/movably connected with the main body 20. Also referring to FIG. 3, the main body 20 includes a base sheet 22, a sensing unit 24, a signal converting unit 26, and a signal processing unit 27. The sensing unit 24, the signal converting unit 26, and the signal processing unit 27 are electrically connected in series and disposed on the base sheet 22 of the main body 20.

The base sheet 22 can be a part of an existing printed circuit board (PCB) and mounted in the main body 20. The base sheet 22 is configured for supporting some electronic components of the portable electronic device 100 and connecting the electronic components with each other.

The sensing unit 24 can be an existing magnetic sensor. The sensing unit 24 is configured for sensing changes of external magnetic field, and generating a corresponding command signal. The signal converting unit 26 can be an existing analog/digital signal (A/D) converter. The signal converting unit 26 is configured for transforming the command signal from the sensing unit 24 into digital signal, and transmitting the digital signal to the signal processing unit 27.

The signal processing unit 27 can be integrated with the central processing unit (CPU) of the portable electronic device 100. The signal processing unit 27 is configured for receiving the digital signal from the signal converting unit 26 and generating a control signal after processing the digital signal, such that the signal processing unit 27 can control different operation modes, such as operational mode, standby mode, sleep mode, screen saver mode, and so on.

The cover member 40 includes an audio output unit 44 and a display unit 46. The display unit 46 is disposed in the cover member 40 and electrically connected to the signal processing unit 27.

The audio output unit 44 can be integrated with a speaker of the portable electronic device 100. The audio output unit 44 is fixed inside the cover member 40 and the position of the audio output unit 44 matches and is consistent with the position of the sensing unit 24 to produce magnetic induction. The audio output unit 44 includes a magnetic member 442 and a coil member (not shown).

The magnetic member 442 can be a circular magnetic device to generate a magnetic field. When current flows through the coil member, the coil member produces a magnetic field around, such that the magnetic field of the magnetic member 442 and the coil member interact to generate audio signals. When the cover member 40 is opened or closed relative to the main body 20, the magnetic member 442 slides along the main body 20, and a distance between the magnetic member 442 and the sensing unit 24 changes. As a result, the magnetic field between the sensing unit 24 and the audio output unit 44 changes; the sensing unit 24 detects a change in the magnetic field from the displacement of the magnetic member 442 and thus, determining different operation modes of the portable electronic device 100 accordingly.

The display unit 46 can be integrated with the liquid crystal display module (LCM). The display unit 46, as an output interface of a user, is configured for displaying various information and operation instructions corresponding different operation modes. For example, when the cover member 40 is opened relative to the main body 20, the display unit 46 can be in operational mode. When the cover member 40 is closed relative to the main body 20, the display unit 46 may be in standby mode, sleep mode, or screen saver mode.

Referring to FIGS. 1-2, in use, when the cover member 40 is opened or closed relative to the main body 20, the magnetic member 442 slides relative the main body 20. A distance between the magnetic member 442 and the sensing unit 24 changes, thus, the magnetic field between the sensing unit 24 and the audio output unit 44 changes also. The sensing unit 24 generates and sends a corresponding command signal according to the change of magnetic field detected. The signal converting unit 26 receives the command signal from the sensing unit 24 and transforms the command signal into corresponding digital signal. The signal processing unit 27 receives and processes the digital signal to generate a control signal. Thus, the portable electronic device 100 adopts different operation modes under the control of the signal processing unit 27.

The sensing unit 24 can be disposed in the cover member 40, and the audio output unit 44 can be correspondingly disposed in the main body 20. As long as when the cover member 40 slides along the main body 40, the change in the magnetic field between the sensing unit 24 and the audio output unit 44 produces a command signal.

Similarly, when the portable electronic device 100 is a flip type device, the cover member 40 can be rotatably/movably connected with the main body.

In the portable electronic device 100 of the exemplary embodiment, the audio output unit 44, facilitating as a speaker of the portable electronic device 100, can not only output different audio signals, but the magnetic member 442 of the audio output unit 44 can also facilitate the additional magnetic device as said above to form a magnetic field. Thus, when the cover member 40 slides along relative to the main body 20, the portable electronic device 100 can actuate different operation modes. Therefore, there is no need to add an additional magnetic device in the cover member 40 or the main body 20, so that the size, weight and cost of the portable electronic device 100 are reduced.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A portable electronic device, comprising:
    a main body;
    a cover member movably connected with the main body;
    an audio output unit disposed in one of the main body and the cover member, and the audio output unit comprising of a magnetic member;
    a sensing unit disposed in the other of the main body and the cover member, and configured for detecting relative displacement of the magnetic member and capable of generating a corresponding command signal; and
    a signal processing unit electrically connected to the sensing unit, wherein the signal processing unit is capable of actuating different operation modes according to the command signal.

2. The portable electronic device as claimed in claim 1, further comprising a signal converting unit electrically connected to the sensing unit and the signal processing unit, wherein the signal converting unit is configured for receiving the command signal from the sensing unit and transforming the command signal into digital signal.

3. The portable electronic device as claimed in claim 2, further comprising a base sheet, wherein the sensing unit, the signal converting unit, and the signal processing unit are disposed on the base sheet.

4. The portable electronic device as claimed in claim 1, wherein when the magnetic member moves relative to the main body and a distance between the magnetic member and the sensing unit changes, the sensing unit is capable of generating the command signal due to the change in the magnetic field between the sensing unit and the audio output unit.

5. The portable electronic device as claimed in claim 1, wherein the cover member includes a display unit electrically connected to the signal processing unit, and the display unit is configured for displaying various information and operation instructions corresponding different operation modes.

6. A portable electronic device, comprising:
    a main body;
    a cover member movably connected with the main body;
    an audio output unit, disposed in one of the main body and the cover member, and the audio output unit comprising of a magnetic member;
    a sensing unit disposed in the other of the main body and the cover member, and configured for detecting relative displacement of the magnetic member and capable of generating a corresponding command signal;
    a signal converting unit electrically connected to the sensing unit, and the signal converting unit configured for receiving the command signal and capable of transforming the command signal from the sensing unit; and
    a signal processing unit electrically connected to the signal converting unit, wherein the signal processing unit is capable of receiving the signal from the signal converting unit and generating a corresponding control signal to actuate different operation modes according to the control signal.

7. The portable electronic device as claimed in claim 6, wherein the signal converting unit is configured for transforming the command signal from the sensing unit into a digital signal.

8. The portable electronic device as claimed in claim 6, further comprising a base sheet, wherein the sensing unit, the signal converting unit and the signal processing unit are disposed on the base sheet.

9. The portable electronic device as claimed in claim 6, wherein when the magnetic member moves relative to the main body and a distance between the magnetic member and the sensing unit changes, the sensing unit is capable of generating the command signal due to the change in the magnetic field between the sensing unit and the audio output unit.

10. The portable electronic device as claimed in claim 6, wherein the cover member includes a display unit electrically connected to the signal processing unit, and the display unit is configured for displaying various information and operation instructions corresponding different operation modes.

* * * * *